US008160886B2

(12) United States Patent
Tessel et al.

(10) Patent No.: US 8,160,886 B2
(45) Date of Patent: *Apr. 17, 2012

(54) OPEN ARCHITECTURE FOR A VOICE USER INTERFACE

(75) Inventors: Marianna Tessel, Palo Alto, CA (US); Danny Lange, Cupertino, CA (US); Eugene Ponomarenko, Fremont, CA (US); Mitsuru Oshima, San Jose, CA (US); Daniel Burkes, San Francisco, CA (US); Tjoen Min Tjong, Milpitas, CA (US)

(73) Assignee: Ben Franklin Patent Holding LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,269

(22) Filed: Aug. 1, 2011

(65) Prior Publication Data

US 2011/0289188 A1 Nov. 24, 2011

Related U.S. Application Data

(63) Continuation of application No. 12/389,876, filed on Feb. 20, 2009, now Pat. No. 8,005,683, which is a continuation of application No. 11/340,844, filed on Jan. 27, 2006, now Pat. No. 7,496,516, which is a continuation of application No. 09/732,812, filed on Dec. 8, 2000, now Pat. No. 7,016,847.

(51) Int. Cl.
*G10L 21/00* (2006.01)
*G06F 15/16* (2006.01)

(52) U.S. Cl. ........................................ 704/275; 709/217
(58) Field of Classification Search .................. 704/275; 709/217

See application file for complete search history.

(56) References Cited

U.S. PATENT DOCUMENTS

| 6,247,052 | B1 * | 6/2001 | Huang et al. | 709/224 |
| 7,054,866 | B2 * | 5/2006 | Trivedi | 1/1 |
| 7,441,007 | B1 * | 10/2008 | Kirkpatrick et al. | 709/213 |
| 8,018,955 | B2 * | 9/2011 | Agarwal et al. | 370/401 |

* cited by examiner

*Primary Examiner* — Susan McFadden
(74) *Attorney, Agent, or Firm* — Sterne, Kessler, Goldstein & Fox PLLC

(57) ABSTRACT

A system and method for processing voice requests from a user for accessing information on a computerized network and delivering information from a script server and an audio server in the network in audio format. A voice user interface subsystem includes: a dialog engine that is operable to interpret requests from users from the user input, communicate the requests to the script server and the audio server, and receive information from the script server and the audio server; a media telephony services (MTS) server, wherein the MTS server is operable to receive user input via a telephony system, and to transfer the user input to the dialog engine; and broker coupled between the dialog engine and the MTS server. The broker establishes a session between the MTS server and the dialog engine and controls telephony functions with the telephony system.

20 Claims, 9 Drawing Sheets

OPEN ARCHITECTURE FOR A VOICE USER INTERFACE

CROSS-REFERENCE TO RELATED APPLICATION

This application is a continuation of U.S. patent application Ser. No. 12/389,876, filed Feb. 20, 2009, now allowed, and entitled "OPEN ARCHITECTURE FOR A VOICE USER INTERFACE," which is a continuation of U.S. application Ser. No. 11/340,844, filed Jan. 27, 2006, issued as U.S. Pat. No. 7,496,516 on Feb. 24, 2009, which is a continuation of U.S. application Ser. No. 09/732,812, filed Dec. 8, 2000, issued as U.S. Pat. No. 7,016,847, on Mar. 21, 2006, and is additionally related to and incorporates by reference herein its entirety the commonly owned and concurrently filed patent applications:

Ser. No. 09/733,848 entitled "SYSTEM FOR EMBEDDING PROGRAMMING LANGUAGE CONTENT IN VOICE XML" by Marianna Tessel, et al., hereinafter the "VoiceXML Language patent application".

REFERENCE TO APPENDIX

This application incorporates by reference herein in its entirety the Appendix filed herewith that includes source code for implementing various features of the present invention.

BACKGROUND OF THE INVENTION

With the continual improvements being made in computerized information networks, there is ever-increasing need for devices capable of retrieving information from the networks in response to a user's request(s). Devices that allow the user to enter requests using voice commands and to receive the information in audio format, are becoming increasingly popular. These devices are especially popular for use in a variety of situations where entering commands via a keyboard is not practical.

As technologies including telephony, media, text-to-speech (TTS), and speech recognition undergo continued development, it is desirable to periodically update the devices with the latest capabilities.

It is also desirable to provide a modular architecture that can incorporate components from a variety of vendors, and can operate without requiring knowledge of, or changes to, the application for which the device is utilized.

It is further desirable to provide a system that can be scaled up to tens of thousands of simultaneously active telephony sessions. This includes independently scaling the telephony, media, text to speech and speech recognition resources as needed.

SUMMARY OF THE INVENTION

A system and method for processing voice requests from a user for accessing information on a computerized network and delivering information from a script server and an audio server in the network in audio format. A voice user interface subsystem includes: a dialog engine that is operable to interpret requests from users from the user input, communicate the requests to the script server and the audio server, and receive information from the script server and the audio server; a media telephony services (MTS) server, wherein the MTS server is operable to receive user input via a telephony system, and to transfer the user input to the dialog engine; and a broker coupled between the dialog engine and the MTS server. The broker establishes a session between the MTS server and the dialog engine and controls telephony functions with the telephony system.

The present invention advantageously supports a wide range of voice-enabled telephony applications and services. The components included in the system are modular and do not require knowledge of the application in which the system is being used. Additionally, the system is not dependent on a particular vendor for speech recognition, text to speech translation, or telephony, can therefore readily incorporate advances in telephony, media, TTS and speech recognition technologies. The system is also capable of scaling up to tens of thousands of simultaneously active telephony sessions. This includes independently scaling the telephony, media, text to speech and speech recognition resources as needed.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
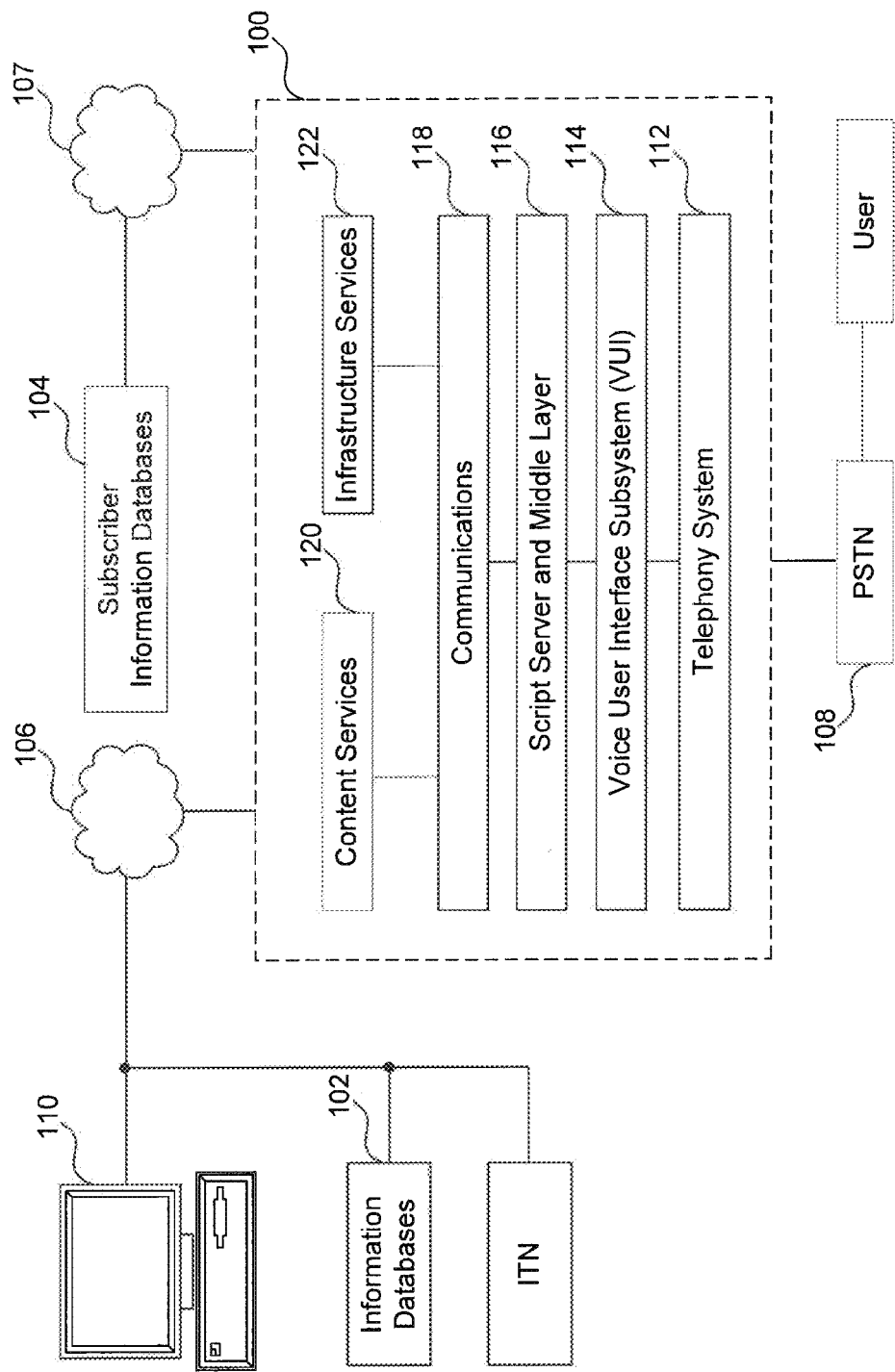
FIG. 1 is a block diagram of an information network within which the present invention can be utilized.

FIG. 1 shows a virtual advisor (VA) system 100 in accordance with the present invention that allows users to enter voice commands through a voice user interface (VUI) while operating their vehicles to request information from both public information databases 102 as well as subscription-based information databases 104. Public information databases 102 are accessible through a computer network 106, such as, for example, a world wide network of computers commonly referred to as the Internet. Subscription-based information databases 104 are also accessible through a computer network 107 to users that have paid a subscription fee. An example of such a database is the OnStar system provided by General Motors Corporation of Detroit, Mich. Both types of databases can provide information in which the user is interested, such as news, weather, sports, and financial information, along with electronic mail messages. The VA system 100 receives information from databases 102, 104 in audio or text formats, converts information in text format to audio format, and presents the information to the user in audio format.

Users access VA system 100 through a telephone network, such as Public Switched Telephone Network (PSTN) 108, which is a known international telephone system based on copper wires carrying analog voice data. Access via other known telephone networks including integrated services digital network (ISDN), fiber distributed data interface (FDDI), and wireless telephone networks can also be utilized.

Users can also connect to VA system 100 and subscriber information databases 104 through the computer network 106 using an application program, commonly referred to in the art as a browser, on workstation 110. Browsers, such as Internet Explorer by Microsoft Corporation and Netscape Navigator by Netscape, Inc., are well known and commercially available. The information can be output from workstation 110 in audio format and/or in text/graphics formats when workstation 110 includes a display. Subscriber database 104 can provide a graphical user interface (GUI) on workstation 110 for maintaining user profiles, setting up e-mail consolidation and filtering rules, and accessing selected content services from subscriber databases 104.

Those skilled in the art will appreciate that workstation 110 may be one of a variety of stationary and/or portable devices that are capable of receiving input from a user and transmitting data to the user. Workstation 110 can be implemented on desktop, notebook, laptop, and hand-held devices, television set-top boxes and interactive or web-enabled televisions, telephones, and other stationary or portable devices that include information processing, storage, and networking components. The workstation 110 can include a visual display, tactile input capability, and audio input/output capability.

Telephony subsystem 112 provides a communication interface between VA system 100 and PSTN 108 to allow access to information databases 102 and 104. Telephony subsystem 112 also interfaces with VUI Subsystem 114 which performs voice user interface (VUI) functions according to input from the user through telephony subsystem 112. The interface functions can be performed using commercially available voice processing cards, such as the Dialogic Telephony and Voice Resource card from Dialogic Corporation in Parsippany, N.J. In one implementation, the cards are installed on servers associated with VUI Subsystem 114 in configurations that allow each MTS box to support up to 68 concurrent telephony sessions over ISDN T-1 lines connected to a switch. One suitable switch is known as the DEFINITY Enterprise Communications Server that is available from Lucent Technologies, Murray Hill, N.J.

Script server and middle layer 116 generate dialog scripts for dialog with the user. The script server interprets dialog rules implemented in scripts. VUI Subsystem 114 converts dialog instructions into audio output for the user and interprets the user's audio response.

Communications module 118 handles the interface between content services 120 and infrastructure services 122. A commercially available library of communication programs, such as CORBA can be used in communications module 118. Communications module 118 can also provide load balancing capability.

Content services 120 supply the news, weather, sports, stock quotes and e-mail services and data to the users. Content services 120 also handle interfaces to the outside world to acquire and exchange e-mail messages, and to interface with networks 106, 107, and the script server and middle layer routines 116.

Infrastructure services 122 provide infrastructure and administrative support to the content services 120 and script server and middle layer routines 116. Infrastructure services 122 also provide facilities for defining content categories and default user profiles, and for users to define and maintain their own profiles.

Figure 2:
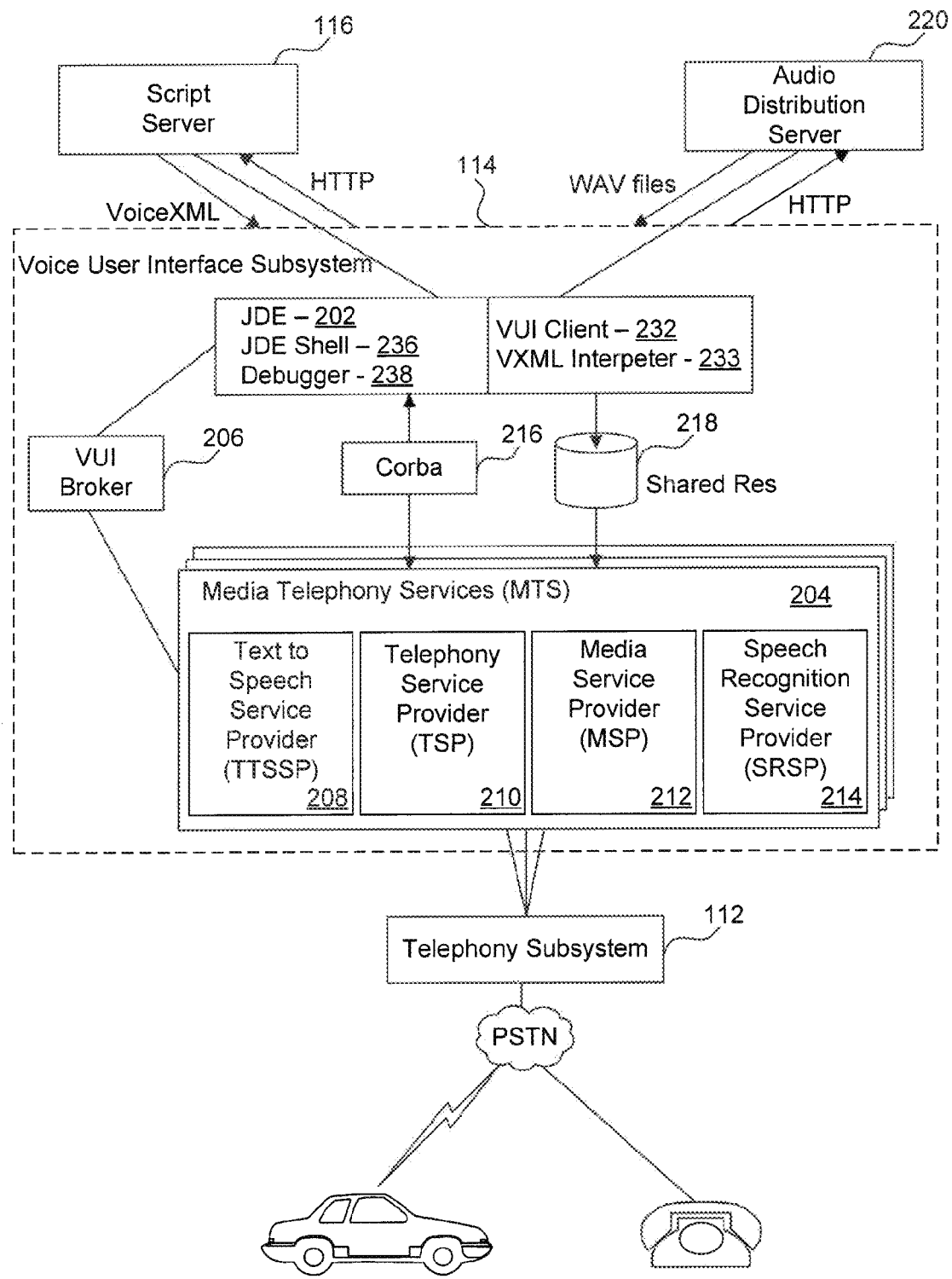
FIG. 2 is a block diagram of components included in a voice user interface system in accordance with the present invention.

Referring now to FIGS. 1 and 2, the VUI Subsystem 114 includes three major components that combine to function as a voice browser. VoiceXML Dialog Engine (VDE) 202 handles the interface with the script server 116, interprets its requests and returns the users' responses. VDE 202 is capable of handling multiple sessions. It includes resource management tools such as persistent HTTP connection and efficient caching, as known in the art. VDE 202 can also accept parameters regarding how many incoming calls and how many outbound calls it should accept.

In one implementation, script server 116 receives instructions, and transmits user response data and status, using hypertext transfer protocol (HTTP). Data from script server 116 are transmitted in voice extensible markup language (XML) scripts.

Media telephony services (MTS) server 204 interfaces the VUI subsystem 114 with telephony subsystem 112. MTS server 204 includes text to speech service provider (TTSSP) 208 to convert information in text format to audio format; telephony service provider (TSP) 210 to interface with telephony subsystem 112; media service provider (MSP) 212 to provide audio playback; and speech recognition service provider (SRSP) 214 to perform speech recognition.

In one implementation, each service provider 208, 210, 212, 214 is contained in a separate, vendor-specific DLL, and is independent of all other service providers. Each service provider 208, 210, 212, 214 implements an abstract application programmer's interface (API), as known in the art, that masks vendor-specific processing from the other service providers in MTS server 204 that use its services. These abstract APIs allow service providers to call each other, even in heterogeneous environments. Examples of the APIs are included in the Appendix under the following names: MediaChannel.cpp; SpeechChannel.cpp; TTSChannel.cpp; and TelephonyChannel.cpp.

TTSSP 208 implements a text to speech (TTS) API for a given vendor's facilities. TTSSP 208 supports methods such as SynthesizeTTS, as well as notifying the MTS server 204 when asynchronous TTS events occur. In one implementation, the RealSpeak Text To Speech Engine by Lernout and Hauspie Speech Products N.V. of Flanders, Belgium is used for text to speech conversion. In another implementation, the AcuVoice Text To Speech Engine by Fonix of Salt Lake City, Utah is used for text to speech conversion.

Each TSP 210 implements a telephony API for a given vendor's hardware and a given telephony topology. TSP 210 supports methods such as PlaceCall, DropCall, AnswerCall, as known in the art, as well as notifying the MTS server 204 when asynchronous telephony events, such as CallOffered and CallDropped, occur.

MSP 212 implements a media API for a given vendor's hardware. MSP 212 supports methods such as PlayPrompt, RecordPrompt, and StopPrompt, as well as notifying the MTS server 204 when asynchronous media events, such as PlayDone and RecordDone, occur.

SRSP 214 implements a speech recognition API for a given vendor's speech recognition engine and supports methods such as "recognize" and "get recognition results," as well as notifying the MTS server 204 when asynchronous speech recognition events occur. One implementation of SRSP 214 uses the Nuance Speech Recognition System (SRS) 228 offered by Nuance Corporation in Menlo Park, Calif. The Nuance SRS includes three components, namely, a recognition server, a compilation server, and a resource manager. The components can reside on MTS server 204 or on another processing system that is interfaced with MTS server 204. Other speech recognition systems can be implemented instead of, or in addition to, the Nuance SRS.

In one implementation, MTS server 204 interfaces with the VDE 202 via Common Object Request broker Architecture (CORBA) 216 and files in waveform (WAV) format in shared storage 218. CORBA is an open distributed object computing infrastructure being standardized by the Object Management Group (OMG). OMG is a not-for-profit consortium that produces and maintains computer industry specifications for interoperable enterprise applications. CORBA automates many common network programming tasks such as object registration, location, and activation; request demultiplexing; framing and error-handling; parameter marshaling and demarshalling; and operation dispatching.

Each MTS server 204 is configured with physical hardware resources to support the desired number of dedicated and shared telephone lines. For example, in one implementation, MTS server 204 supports three T-1 lines via the Dialog Telephony Card, and up to 68 simultaneous telephony sessions.

Although communication between the user, the MTS server 204 and VDE 202 is full-duplex, i.e., MTS server 204 can listen while it is "talking" to the user through the "Barge-in" and "Take a break" features in MTS server 204.

In many instances when a recording or prompt is being played, the user is allowed to interrupt the VA system 100. This is referred to as "barge-in." As an example, users are allowed to say "Next" to interrupt playback of e-mail in which they are not interested. When a recognized interruption occurs, MTS server 204 stops current output and flushes any pending output.

The "Take a break" feature allows users to tell the VA system 100 to ignore utterances that it "hears" (so they may have a conversation with a passenger, for example). In one implementation, when the users say, "Take a break," the VA system 100 suspends speech recognition processing until it recognizes "Come back." Support for the "barge in" and "take a break" features can be implemented at the application level or within MTS server 204.

VUI broker 206 establishes VDE/MTS sessions when subscribers call VA system 100. VUI broker 206 allocates an MTS server 204 and a VUI client object 232 in response to out-dial requests from an application program. An application is a program that uses the VUI subsystem 114. VUI broker 206 also allocates a VUI client object 232 in response to incoming requests from an MTS server 204.

A VUI client object 232 identifies the VUI client program for VUI broker 206 and MTS server 204. VUI client object 232 also acts as a callback object, which will be invoked by VUI broker 206 and MTS server 204. When MTS server 204 receives an incoming call, it delegates the task of finding a VUI client object 232 to handle the call to VUI broker 206. VUI broker 206 then selects one of the VUI client objects 232 that have been registered with it, and asks whether the VUI client object 232 is interested in handling the call.

MTS server 204 also calls various methods of VUI client object 232 to get telephony-related notifications. To receive these notifications, the VUI client object 232 must first make itself visible to VUI broker 206. A VUI client object 232, therefore, must locate VUI broker 206 through a naming service, such as CosNaming or Lightweight Directory Access Protocol (LDAP), as known in the art, and register the VUI client object 232 with it.

VUI client objects 232 support at least the following functions:

a) Receive call-related notifications (call connected, call cancelled, Dual Tone Multi-Frequency, etc.)

b) A callback method to determine whether to handle the incoming call.

c) Receive termination event of the session.

VUI client object 232 includes Connection, Session, and Prompt wrapper classes that provide a more synchronous API on top of the VUI broker 206. The Prompt class is an object that defines prompts such as TTS, AUDIO, or SILENCE prompts.

The VUI broker 206 supports at least the following functions:

a) Place a call.

b) Update available line information for a particular MTS server 204.

c) Update the number of calls handled by a particular VUI client 232.

d) Unregister VUI clients and MTS servers 204.

e) Find a VUI client for an inbound call.

VUI subsystem 114 also includes a multi-threaded Voice XML (VoiceXML) interpreter 233, VUI client object 232, and application 234. Application 234 includes VDE 202, VDE shell 236, and an optional debugger 238. Application 234 interfaces with other components such as script server 116, audio distribution server 220, VoiceXML interpreter 233, and manages resources such as multiple threads and interpreters.

VDE shell 236 is a command line program which enables the user to specify and run the VoiceXML script with a given number. This is a development tool to help with writing and testing VoiceXML script.

Figure 2A:
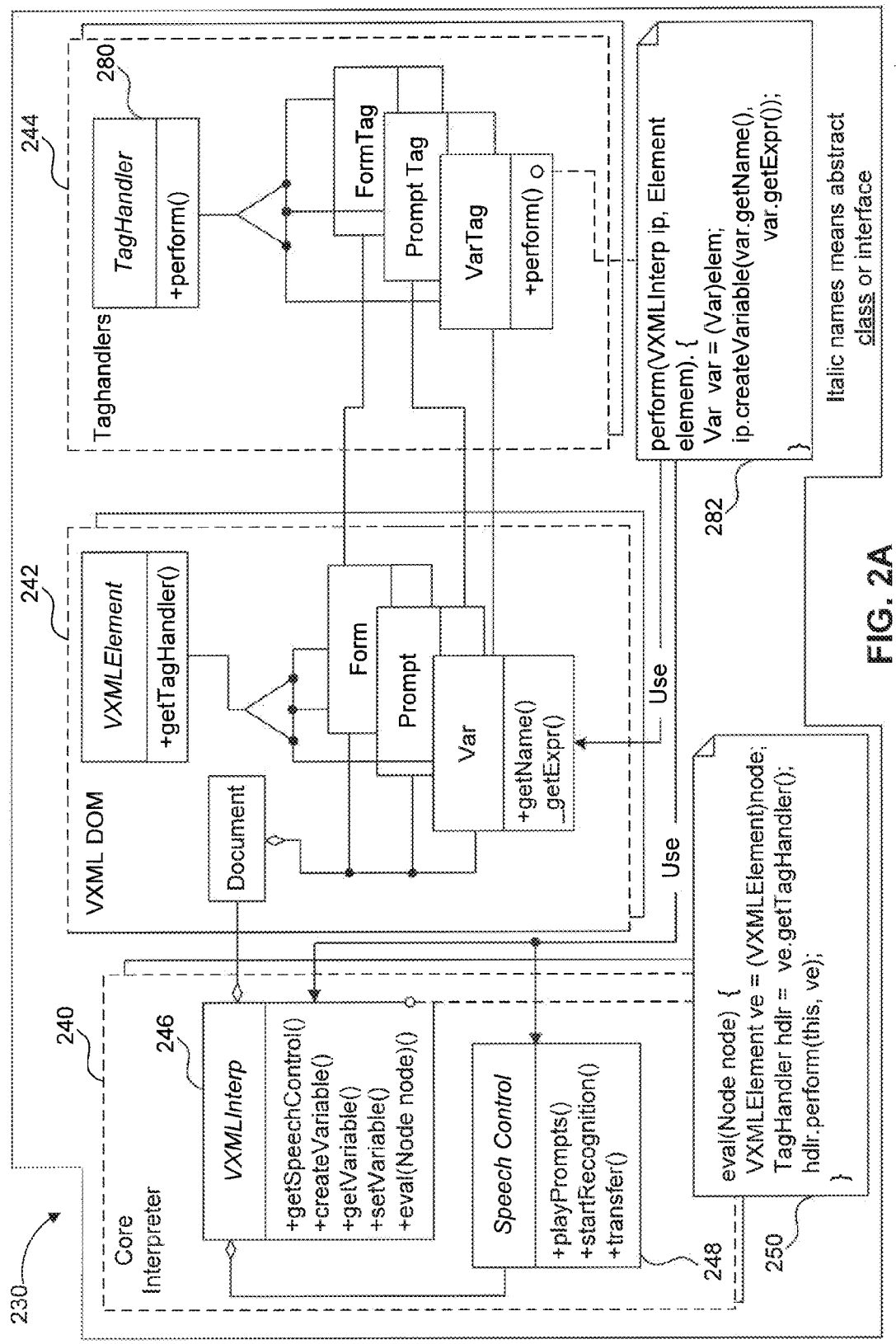
FIG. 2a is a block diagram of components included in a Voice XML interpreter in accordance with the present invention.

The VoiceXML interpreter 233 interprets XML documents. The interpreter 230 can be further divided into three major classes: core interpreter class 240, VoiceXML document object model (DOM) class 242, and Tag Handlers class 244, as shown in FIG. 2*a*. The VoiceXML Interpreter 233 also includes a set of API classes that enable extending/adopting new functionality as VoiceXML requirements evolve.

The core interpreter class 240 defines the basic functionality that is needed to implement various kinds of tags in the VoiceXML. Core interpreter class 240 includes VoiceXML interpreter methods (VoiceXMLInterp) 246, which can be used to access the state of the VoiceXML interpreter 233 such as variables and documents. VoiceXMLInterp 246 is an interface to VoiceXML interpreter 230, which is used to process VoiceXML tags represented by DOM objects. Core interpreter class 240 also includes speech control methods 248 to control speech functionality, such as playing a prompt or starting recognition.

Core interpreter class 240 includes the eval(Node node) method 250, which takes a DOM node, and performs the appropriate action for each node. It also maintains state such as variables or application root, and includes methods for accessing those states. The primary methods for core interpreter class 240 include:

```
public boolean hasDefinedVariable(int scope, String
    name);
```
Checks if the variable of given name exists in given scope.
```
public Object getVariable(String name) throws EventEx-
    ception;
```
Gets the value of the variable.
```
public void setVariable(String name, Object value) throws
    EventException;
```
Assigns a value to a variable.
```
public void createVariable(String name, Object value);
```
Creates a new variable with the given value in the current scope.
```
Object evalExpression(Expr expr) throws EventExcep-
    tion;
```
Evaluates the expression and returns the result.
```
boolean evalBooleanExpression(Expr expr) throws Even-
    tException;
```
Evaluates the expression and returns the boolean result.
```
public void gotoNext(String next, String submit[ ], int
    method, String enctype, int caching, int timeout) throws
    VoiceXMLException;
```
Directs the current execution to the next dialog (form/menu). It may load the next document, or simply jump to another dialog within the same document.
When it fails to find the next dialog, it throws the EventException with "error.badnext" and remains in the same document.
```
Public void eval(Node node) throws VoiceXMLException;
```
Evaluates the given node. It looks up the corresponding TagHandler for given mode and call the tag handler.
```
public void evalChildren(Node e) throws VoiceXMLEx-
    ception;
```
Evaluates child nodes of the given node. It simply calls the eval(Node) for each child node.
```
public Grammar loadGrammar(ExternalGrammar gram)
throws EventException;
    Loads the grammar file specified in ExternalGrammar
        object. It returns BuiltinGrammar if it is built in, or
        GSLGrammar if it is loaded.
```
Speech Control methods 248 is an interface to access speech recognition and playback capability of VA system 100 (FIG. 1). It can be accessed through the VoiceXMLInterp object 246 and includes methods to play prompts, start recognition, and transfer the result from recognition engine. Since this class implements a CompositePrompt interface, as discussed below, tag implementations that play prompts can use the CompositePrompt API to append prompts.

The primary methods in Speech Control methods 244 include:
```
void playPrompt( );
```
Plays prompts and waits until all play requests complete.
```
RecResult playAndRecognition(Grammar gram, int
    noinput_timeout, int toomuch_timeout, int endspeech_
    timeout, int maxdigit) throws VoiceXMLException;
```
Plays prompt and start recognition. It returns the result of the recognition. If there is no speech, or no match with grammar, it throws noinput, nomatch event respectively.
```
RecordVar•record(int timeout, int toomuch_timeout, int
    endspeech_timeout) throws VoiceXMLException;
```
Records user's input and returns a VoiceXML variable associated with recorded file.
```
public void transferCall(String number, int timeout, bool-
    ean wait);
```
Transfers the current call to a given number.

VoiceXML DOM class 242 is used to construct a parse tree, which is the internal representation of a VoiceXML script. The VoiceXML interpreter 233 processes the parse tree to get information about a script. The VoiceXML DOM class 242 includes the subclasses of the XML Document Object Model and defines additional attributes/functions specific to Voice XML. For example, VoiceXML DOM class 242 includes a field tag with a timeout attribute, and a method to retrieve all active grammars associated with the field.

Tag Handlers class 244 includes objects that implement the actual behavior of each VoiceXML tag. Most VoiceXML tags have a tag handler 280 associated with them. The VoiceXML tags are further described in the VoiceXML Language patent application. The core interpreter 240 looks up the corresponding tag handler object from a given VoiceXML DOM object, and calls the perform(VoiceXMLInterp, Element) method 282 along with VoiceXMLInterp 246 and the VoiceXML Element. Core interpreter 240 may get information from "element" to change the interpreter state, or it may play prompts using VoiceXMLInterp 246. VoiceXMLInterp 246 may further evaluate the child nodes using the interpreter object.

Tag handler 280 includes a perform method 282 to perform actions appropriate for its element. The perform method 282 takes two arguments: VoiceXMLinterp object 246 and the Element which is to be executed. A tag handler implementation uses those objects to get the current state of interpreter 233 and the attributes on the element, performs an action such as evaluating the expression in current context, or further evaluates the child nodes of the element. It may throw an EventException with the event name if it needs to throw a VoiceXML event.

Similar to TagHandler, the ObjectHandler is an interface to be implemented by specific Object Tag. However, the interface is slightly different from TagHandler because the object tag does not have child nodes but submit/expect attributes instead. ObjectHandler is also defined for each URL scheme, but not tag name. When the interpreter encounter the object tag, it examines the src attribute as a URL, retrieves the scheme information, and looks up the appropriate ObjectHandler. It uses the following package pattern to locate an ObjectHandler for the given scheme.
com.genmagic.invui.vxml.object<scheme>.Handler Any Object tag implementation therefore must follow this package name. There is no way to change the way to find an ObjectHandler for now. We can adopt more flexible mechanism used in Prompt Composition API if it is desirable.

The Object Handler includes the following method:
```
public void handle(VoiceXMLinterp ip, String src,
    String submit, String[ ] expect) throws
    VoiceXMLException;
```
Performs action specific to the tag it implements. It may throw EventException if this tag or its child tag decides to throw a VoiceXML event.

The Prompt Composition API composes complex prompts that consist of audio/TTS and silence. A developer can implement a component, called PromptGenerator, which composes specific types of prompts such as phone number, dollar amount, etc. from a given content (string) without knowing how they will be played.

An application of these components, on the other hand, can create the composite prompt by getting a component from PromptGeneratorFactory and using it. Because the Prompt Composition API is defined to be independent of the representation of composite prompts (CompositePrompt), the application can implement its own representation of composite prompts for its own purpose. For example, VDE 202 includes MTSCompositePrompt to play prompts using MTS. A developer can implement VoiceXMLCompositePrompt to generate VoiceXML.

VDE 202 uses the Prompt Composition API to implement "say as" tags, and a "say as" tag can be extended by implementing another PromptGenerator using the Prompt Composition API.

CompositePrompt is an interface to allow the composite prompt generator to construct audio/tts/silence prompts in an implementation independent manner. VoiceXML Interpreter 233 may implement this class to generate MTS server 204 prompts while a Java Server Pages (JSP) component may implement this to generate VoiceXML tags such as <prompt/><audio/><break/>.

Composite Prompt includes the following methods:
void appendAudio(String audio, String alternativeTTS)
Append audio filename to be played.
void appendSilence(int interval)
Append silence in milliseconds.
void appendTo (CompositePrompt)
Append itself to given composite prompt.
void appendTTS(String tts)
Append string to be played using ITS
void clearPrompts( )
Empty all prompts.
void getAllTTS( )
Collect tts string from all sub tts prompts it has.
CompositePrompt getCompositePrompt( )
Return the clone of composite prompt.

PromptGenerator is the parent interface for all prompt generator classes. Specific implementation of PromptGenerator will interpret the given content and append the converted prompts to the given composite prompt. The following methods are included in PromptGenerator:
void appendPrompt (CompositePrompt, String)
Interpret the content and append the converted prompts to the given composite prompt.

PromptGeneratorFactory is the object which is responsible for finding the appropriate PromptGenerator object for given type. The default behavior is that if it cannot find a generator object in the cache, it will try to create a PromptGenerator object with a default class name, such as com.genmagic. invui.vxml.prompt.generator.<type_name>.Handler where type_name is the name of type. It is also possible to customize the way it creates the generator by replacing the default factory with the PromptGeneratorFactory object (see setPromptGeneratorFactory and createPromptGenerator methods below). The following methods are included in PromptGeneratorFactory:
void createPromptGenerator(String klass)
Abstract method to create a prompt generator object for the given type.
static void getPromptGenerator(String klass)
return the prompt generator for a given type.
static void register(String klass, PromptGenerator)
Register the prompt generator with given name.
static void
setPromptGeneratorFactory(PromptGeneratorFactory)
Set the customized factory Referring now to FIGS. 2 and 3, in one implementation, the MTS server 204 instantiates a session object 300 for every active vehicle session. Each session object 300 creates five objects: one each for the Play Media Channel 302, Record Media Channel 304, Speech Channel 306, Text-to-Speech Channel 308, and the Telephony Channel 310. A session object 300 represents an internal "session" established between an MTS server 204 and VUI client 232, and is used mainly to control Speech/Telephony functions. One session may have multiple phone calls, and session object 300 is responsible for controlling these calls. Session object 300 has methods to make another call within the session, connect these calls and drop them, as well as to play prompts and start recognition. The session objects 300 supports at least the following functions:
a) Place another call.
b) Cancel a call.
c) Drop a particular call, or all calls in the session.
d) Transfer a call.
e) Append prompts.
f) Play accumulated prompts.
g) Start recognition.
h) Select calls for input/output.

The channel objects 302, 304, 306, 308, 310 are managed by their associated service providers 208, 210, 212, 214. The Play Media Channel 302 and the Record Media Channel 304, which are different instances of the same object, are both managed by the Media Service Provider 212. Most communications and direction to the channels 302, 304, 306, 308, 310 are from and by the session objects 300, however, some inter-channel communications are direct.

In one implementation, the VDE 202 is written in Java for portability, and can be implemented on a different machine from the MTS server 204. The relationship between the VDE 202 and the Script Server 116 is similar to the relationship between a conventional browser, such as Internet Explorer or Netscape Navigator, and a server using hypertext transfer protocol (HTTP), as known in the art. The VDE 202 receives instructions in the form of VoiceXML commands, which it interprets and forwards to the appropriate Media Telephony Services session for execution. When requested to play named audio files (e.g., canned prompts and recorded news stories), the VDE 202 calls the Audio Distribution Server 220 to retrieve the data in the form of WAV files.

In one implementation, VDE 202 and MTS servers 204 reside on separate machines, and are configured in groups. There can be one VDE group and one MTS group, however, there can be multiple groups of each type, with different numbers of VDE and MTS groups, as needed. The number of instances in an MTS group is determined by the processing load requirements and the number of physical resources available. One MTS server 204 may be limited to a certain number of telephony sessions, for example. The number of instances in a VDE group is sized to meet the processing load requirements. To some extent, the ratio depends on the relative processing speeds of the machines where the VDEs 202 and MTS servers 204 reside.

Depending on the loading, there are two to three VUI brokers 206 for each MTS/VDE group pair. The role of the VUI broker 206 is to establish sessions between specific instances of MTS servers 204 and VDEs 202 during user session setup. Its objective is to distribute the processing load across the VDEs 202 as evenly as possible. VUI brokers 206 are only involved when user sessions are being established; after that, all interactions on behalf of any given session are between the VDE 202 and MTS server 204.

There can be multiple VUI brokers 206 that operate independently and do not communicate with one another. The VDEs 202 keep the VUI brokers 206 up to date with their status, so the VUI brokers 206 have an idea of which physical resources have been allocated. Each MTS server 204 registers itself with all VUI brokers 206 so that, if an MTS server 204 crashes, the VUI broker 206 can reassign its sessions to another MTS server 204. An MTS server 204 only uses the VUI broker 206 that is designated as primary unless the primary fails or is unavailable.

A VUI broker 206 is called by an MTS server 204 to assign a VDE session. It selects an instance using a round-robin scheme, and contacts the VDE 202 to establish the session. If the VDE 202 accepts the request, "it returns a session, which the VUI broker 206 returns to the MTS server 204. In this case, the MTS server 204 sets up a local session and begins communicating directly with the VDE 202. If the VDE 202 refuses the request, the VUI broker 206 picks the next instance and repeats the request. If all VDEs 202 reject the request, the VUI broker 206 returns a rejected response to the MTS server 204. In this case, the MTS server 204 plays a "fast busy" to the caller.

The VDE 202 interfaces with the MTS server 204 via CORBA 216, with audio (WAV) files passed through shared files 218. The interface is bi-directional and essentially half-duplex; the VDE 202 passes instructions to the MTS server 204, and receives completion status, event notifications, and recognition results. In one implementation, MTS server 204 notifications to VDE 202 (e.g., dropped call) are asynchronous.

Figure 3:
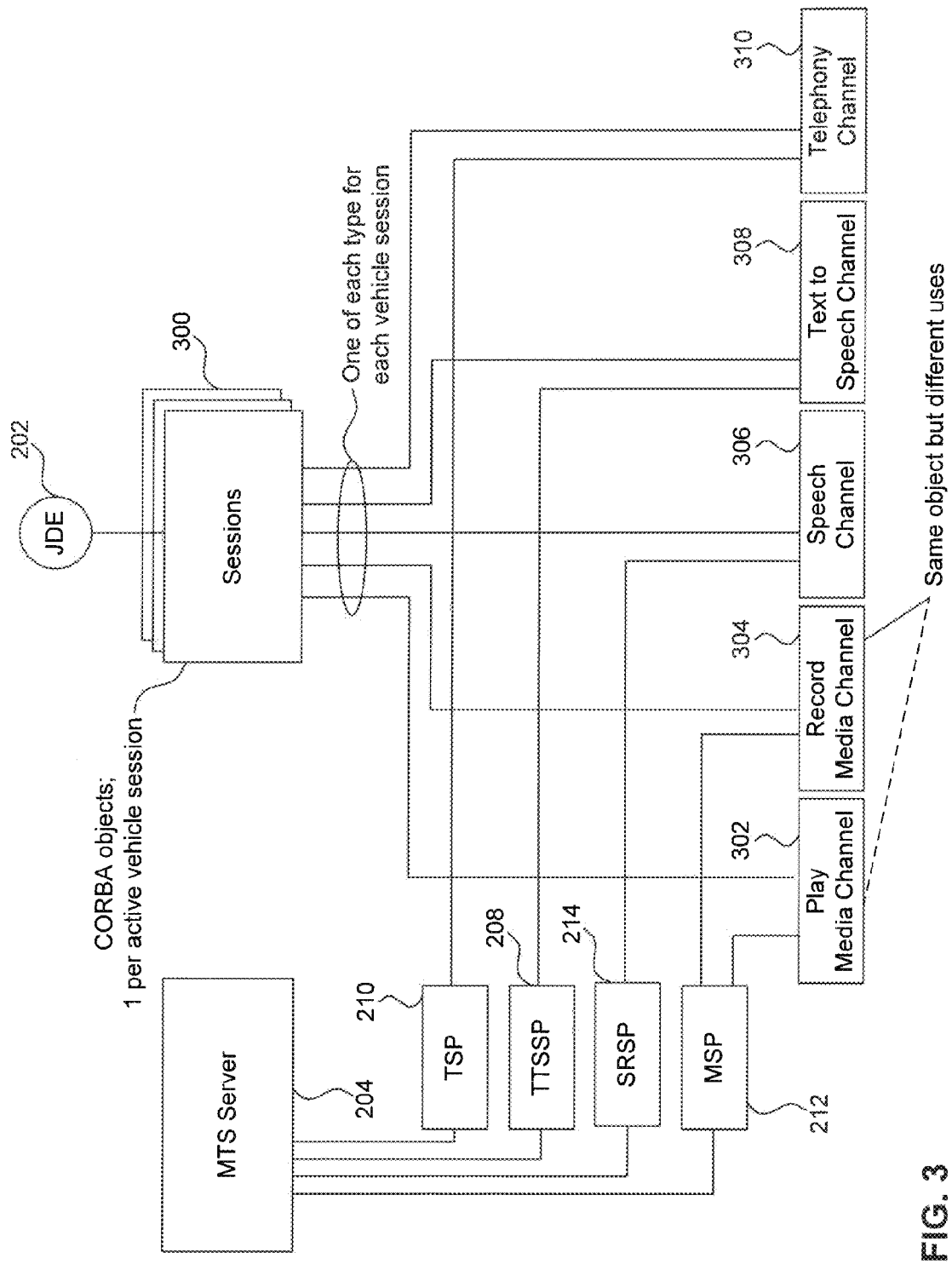
FIG. 3 is a block diagram of components included in a voice user interface system in accordance with the present invention.
Figure 4:
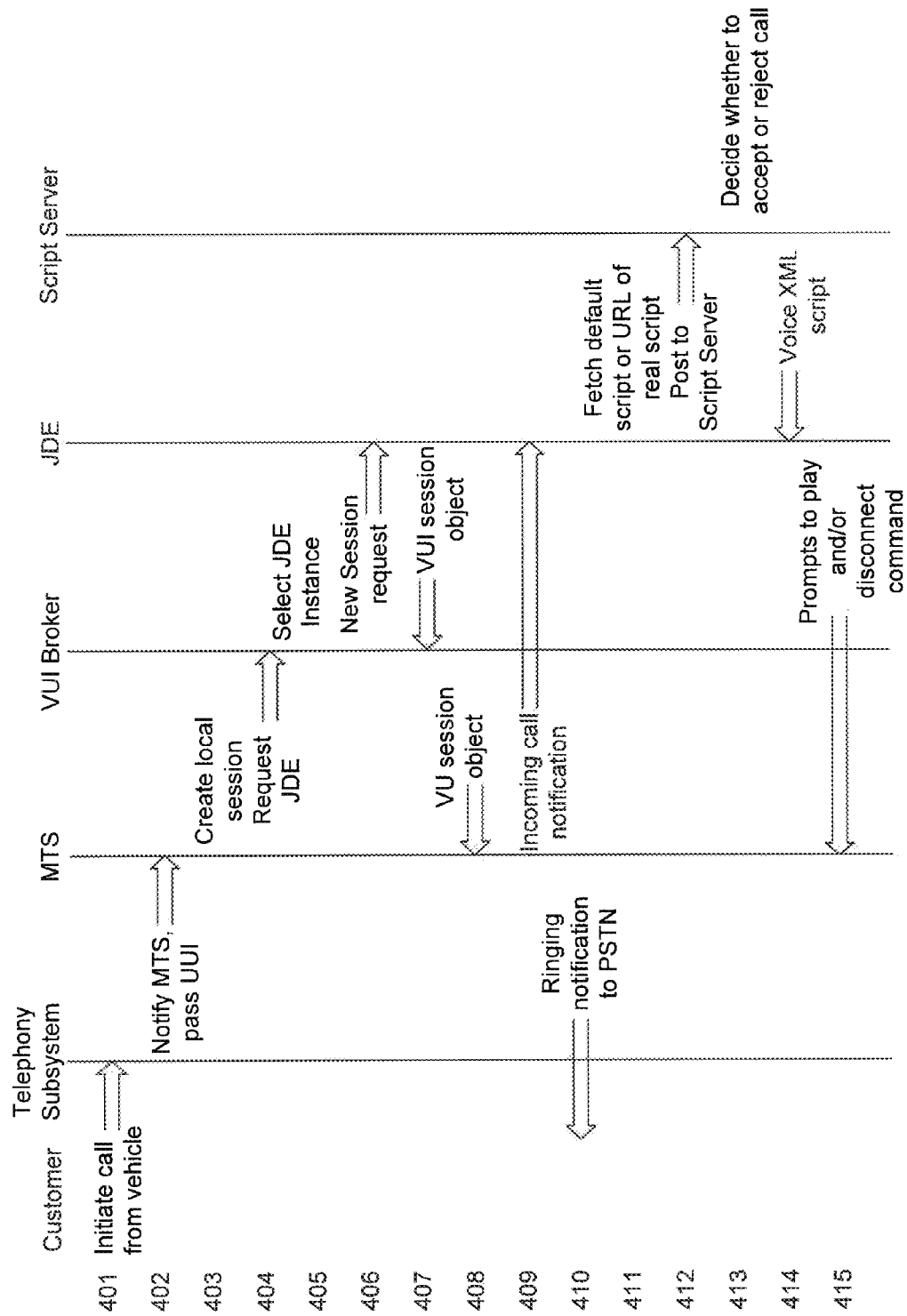
FIG. 4 is a diagram showing an example of processing an incoming call in accordance with the present invention.

Referring now to FIGS. 2, 3, and 4, FIG. 4 shows one method for processing an incoming call. In process 401, a user initiates a call to VUI subsystem 114. In process 402, telephony subsystem 112 receives a new call object on a new telephony channel 310 and notifies MTS server 204 to initiate a new user session. A call object represents a physical session between the MTS server 204 and the end user. It is mainly used as a token/identifier to control individual calls. At any given time, a call object belongs to and is controlled by exactly one VUI session object 300. A call object is a structure, and thus, does not have any methods. Instead, it has the following attributes:

a) Call identification.
  b) A reference to the VUI session object 300 to which it belongs.

Telephony subsystem 112 also passes identification information for the vehicle and the user, and information on how the user's call is switched from data to voice. The MTS server 204 creates the new user session in process 403 and contacts its VUI broker 206 to request a VDE session object 300 in process 404. The MTS server 204 sends this request to its primary VUI broker 206, but would send it to an alternate VUI broker if the primary were unavailable.

In processes 405 and 406, VUI broker 206 selects a VDE instance, and sends a new session request to VDE 202. In process 407, the VDE 202 rejects the request if it cannot accept it (e.g., it is too busy to handle it). In this situation, the VUI broker 206 selects another VDE instance and sends the new session request.

In process 408, VUI broker 206 transmits the VUI session object 300 to MTS server 204. The VUI session object 300 is used for all subsequent communications between the MTS server 204 and VDE 202. MTS server 204 then sends a "new call" message, which contains the DNIS, ANI and UUI data, to the VDE 202 in process 409.

MTS server 204 sends ringing notification to PSTN 108 in process 410 to signify that the call was received. In processes 411 and 412, VDE 202 fetches a default script or sends the address of a different script to script server 116, along with the DNIS, ANI, and UUI data that it received from MTS server 204. An example of a default script is "Please wait while I process your call."

In process 413, the script server 116 uses middle layer components to parse and validate the UUI. Depending on the results of the validation, the script server 116 initiates the appropriate dialog with the user in process 414 by transmitting a VoiceXML script to VDE 202. The VDE 202 then transmits a prompt to MTS server 204 to play the script and continue the session, and/or disconnect the session in process 415.

Figure 5:
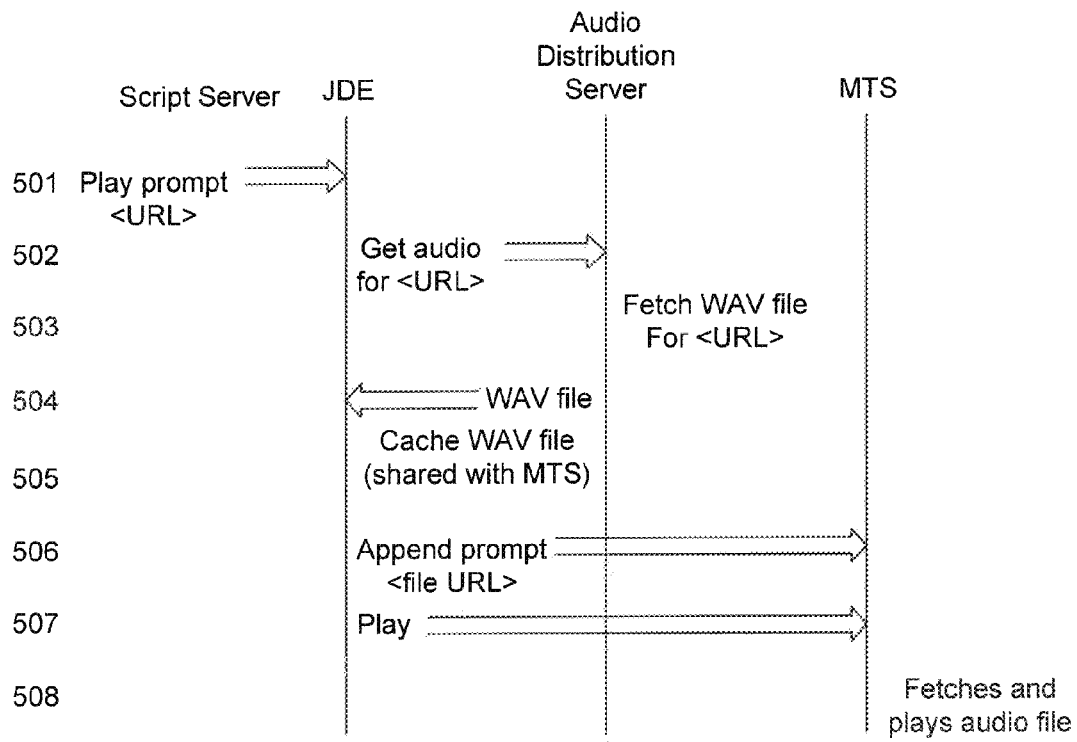
FIG. 5 is a diagram showing an example of processing a play prompt in accordance with the present invention.

Referring now to FIGS. 2 and 5, the high-level process flow by which the script server 116 instructs the MTS server 204 to play a recorded audio file to the user is shown in FIG. 5. In process 501, the script server 116 sends a play prompt to VDE 202. Prompts are prerecorded audio files. A prompt can be static, or it can be news stories or other audio data that was recorded dynamically. Both types of prompts are in the form of audio (WAV) files that can be played directly. The primary difference between the two is that MTS server 204 stores the static prompts in shared files 218, whereas dynamic prompts are passed to MTS server 204 as data. Dynamic prompts are designed for situations where the data are variable, such as news and sports reports. Static prompts can either be stored as built-in prompts, or stored outside of MTS server 204 and passed in as dynamic prompts.

In process 502, the VDE 202 sends a request for the audio file to audio distribution server 220, which fetches the audio file in process 503 and sends it to VDE 202 in process 504. In process 505, the audio file is stored in shared files 218, which is shown as cache memory in FIG. 5 for faster access. The VDE 202 appends the play prompt to the address of the file, and sends it to MTS server 204 in processes 506 and 507. The MTS server 204 subsequently fetches the audio file from shared files 218 and plays it in process 508.

Note that the example shown in FIG. 5 assumes that the request audio file is not currently stored in shared files 218. If the VDE 202 requested the file previously, the VDE 202 sends an indication that the audio file is in its cache along with the request to audio distribution server 220. In this case, the audio distribution server 220 will fetch and return the audio file as shown in FIG. 5 only if the latest version of the audio file is not stored in shared files 218. If the file is up to date, the ADS 220 will respond with status that indicates that the latest version of the audio file is stored in shared files 218.

Figure 6:
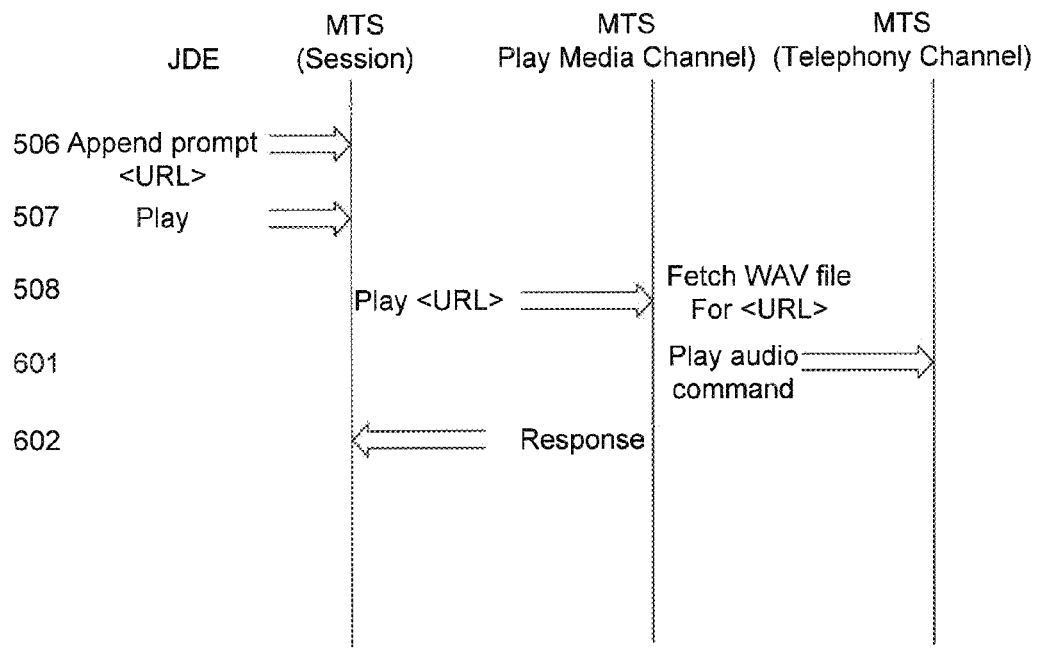
FIG. 6 is a diagram showing an example of processing a play prompt in accordance with the present invention.

The process flow inside MTS server 204 for playing a prompt is shown in FIG. 6. Referring to FIGS. 3 and 6, the VDE 202 appends the play prompt to the address of the file, and sends it to MTS server 204 in processes 506 and 507 using session 300. The MTS server 204 subsequently fetches the audio file from shared files 218 and plays it in process 508 using play media channel 302. In process 601, MTS server 204 sends the play audio command from speech channel 306 to telephony channel 310. A response-indicating whether the audio was successfully accessed and played is then sent in process 602 to session 300 from the play media channel 302 in MTS server 204.

Figure 7:
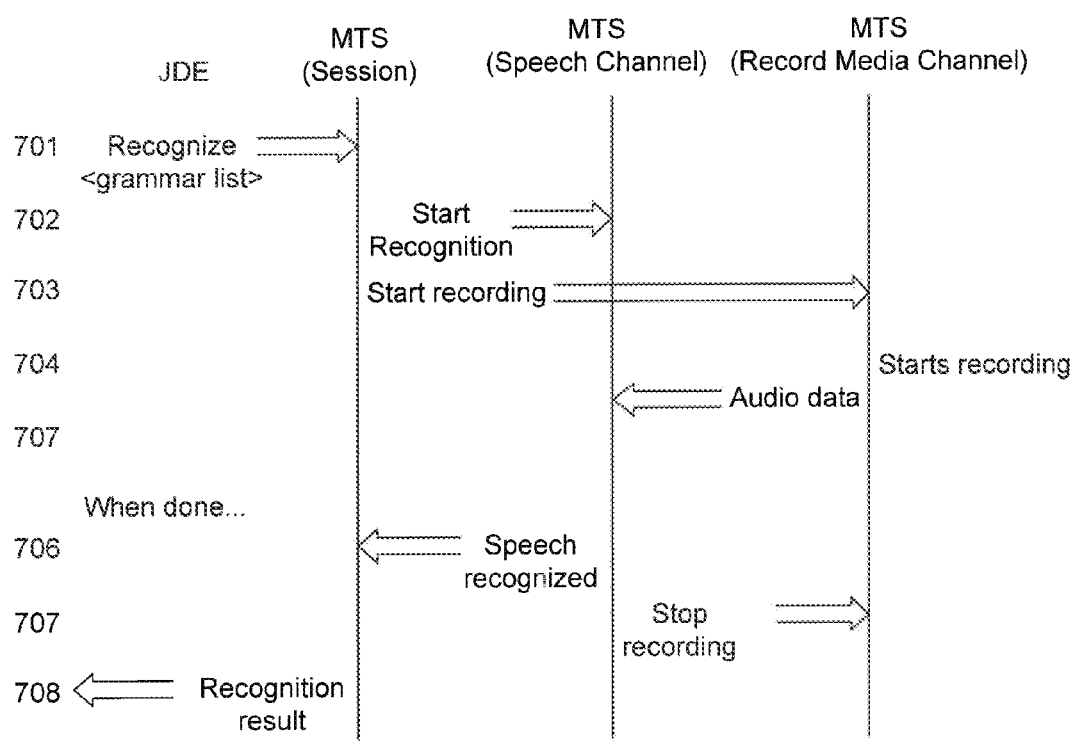
FIG. 7 is a diagram showing an example of processing speech input in accordance with the present invention.

The process flow inside MTS server 204 for speech recognition is shown in FIG. 7. Referring to FIGS. 2, 3, and 7, in process 701, the VDE 202 sends a grammar list that is implemented in VUI subsystem 114 to the session 300 in MTS server 204. The grammar list defines what input is expected from the user at any given point in the dialog. When the VDE 202 issues a Recognize request, it passes the grammar list to the MTS server 204. Words and phrases spoken by the user that are not in the grammar list are not recognized. In one implementation, the MTS server 204 can respond to a Recognize request in one of the following ways:

a) Speech recognized, which returns an indication of what was recognized and the grammar with which it was recognized.
  b) No speech (timeout).
  c) Too much speech.
  d) Errors (many different types).

Grammar lists are specific to the speech recognition vendor. For example, the Nuance Speech Recognition System has two forms: static (compiled) and dynamic. The static version is pre-compiled and is subject to the usual development release procedures. The dynamic version must be compiled before it can be used, which affects start-up or run-time performance. The VUI client obtains a grammar handle object for particular grammar(s) to be activated, before it sends recognition requests. A grammar handle object is a reference to a grammar that is installed and compiled within MTS server 204. Once it is obtained, the client object can use the handle to activate the same grammar within the session.

In process 702, a prompt to start speech recognition is sent from the session 300 to the speech channel 306. In process 703, a prompt to start speech recording is sent from the session 300 to the record media channel 304. The MTS server 204 begins recording in process 704 and sends audio data to speech channel 306. When the speech channel 308 recognizes a command in the speech, process 706 sends notifies session 300 from speech channel 306. A command to stop recording is then sent from speech channel 306 to record media channel 304 in process 707.

The result of the speech recognition is sent from session 300 to VDE 202. Speech recognition service provider 214 identifies certain key words according to the grammar list when they are spoken by a user. For example, the user might say, "Please get my stock portfolio." The grammar recognition for that sentence might be "grammar <command get><type stock>." The key word, or command, is sent to the VDE 202, along with attributes such as an indication of which grammar was used and the confidence in the recognition. The VDE 202 then determines what to do with the response.

The VDE 202 normally queues one or more prompts to be played, and then issues a Play directive to play them. The Append command adds one or more prompts to the queue, and is heavily used. The VDE 202 can send prompts and text-to-speech (TTS) requests individually, and/or combine a sequence of prompts and ITS requests in a single request. Following are examples of requests that the VDE 202 can send to the MTS server 204:

a) Clear Prompts: Clears the output queue for the session.
 b) Append Prompt: Adds the specified prompt or prompts to the queue. The address of the prompt (WAV) file is specified for each prompt.
 c) Append TTS: Adds text to be converted to speech to the queue.
 d) Play Prompts: Initiates processing of the play queue. It returns when all queued prompts and text have been played.
 e) Play Prompts and Recognize: Initiates processing of the play queue and speech recognition. It returns when recognition has completed.
 f) Recognize: Initiates speech recognition. It returns when recognition has completed.
 g) Accept Call: Accepts an incoming call.
 h) Reject Call: Rejects an incoming call.
 i) Drop Call: Drops the line and cleans up session context.

Figure 8:
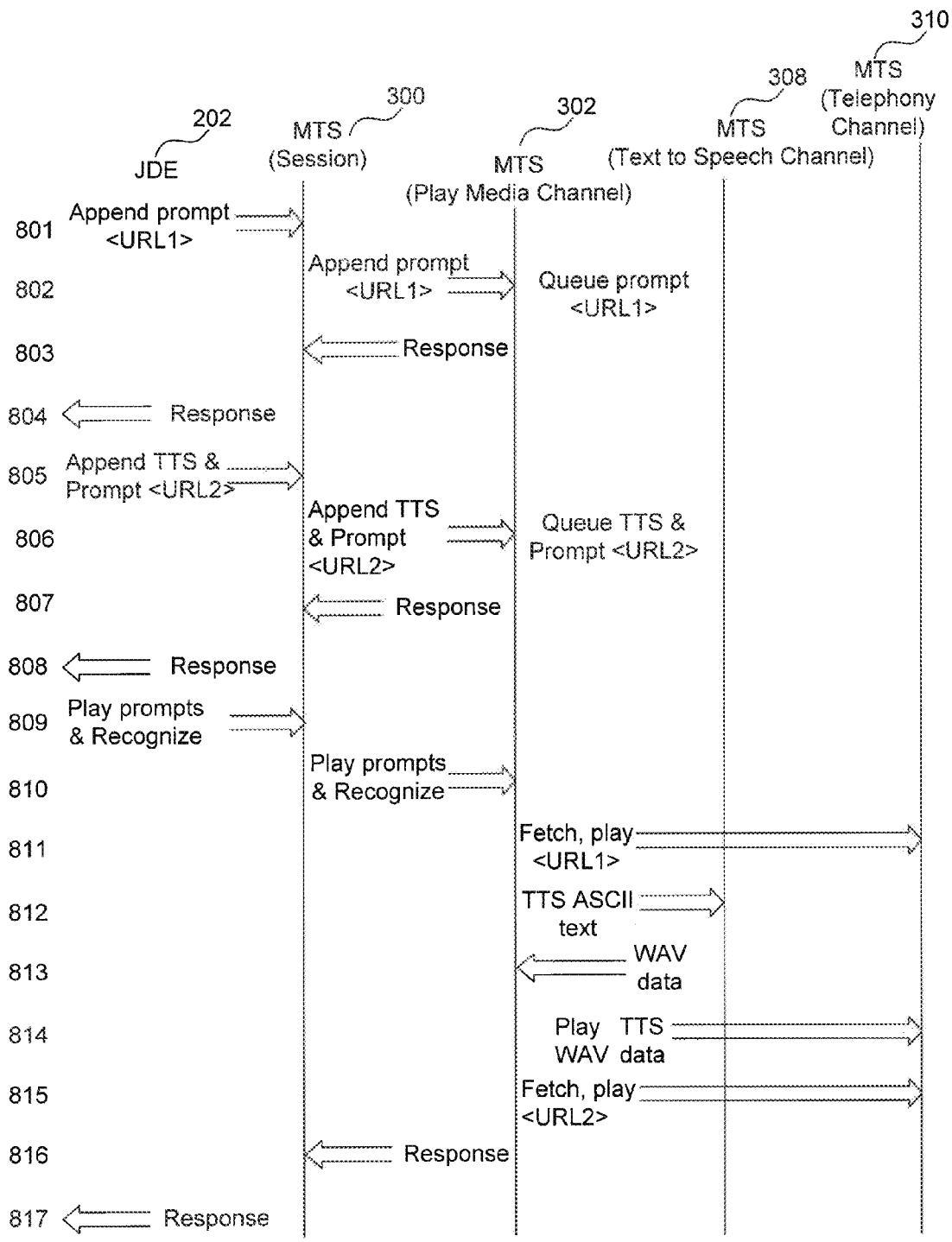
FIG. 8 is a diagram showing an example of processing multiple prompts including text to speech processing in accordance with the present invention.
Figure 9:
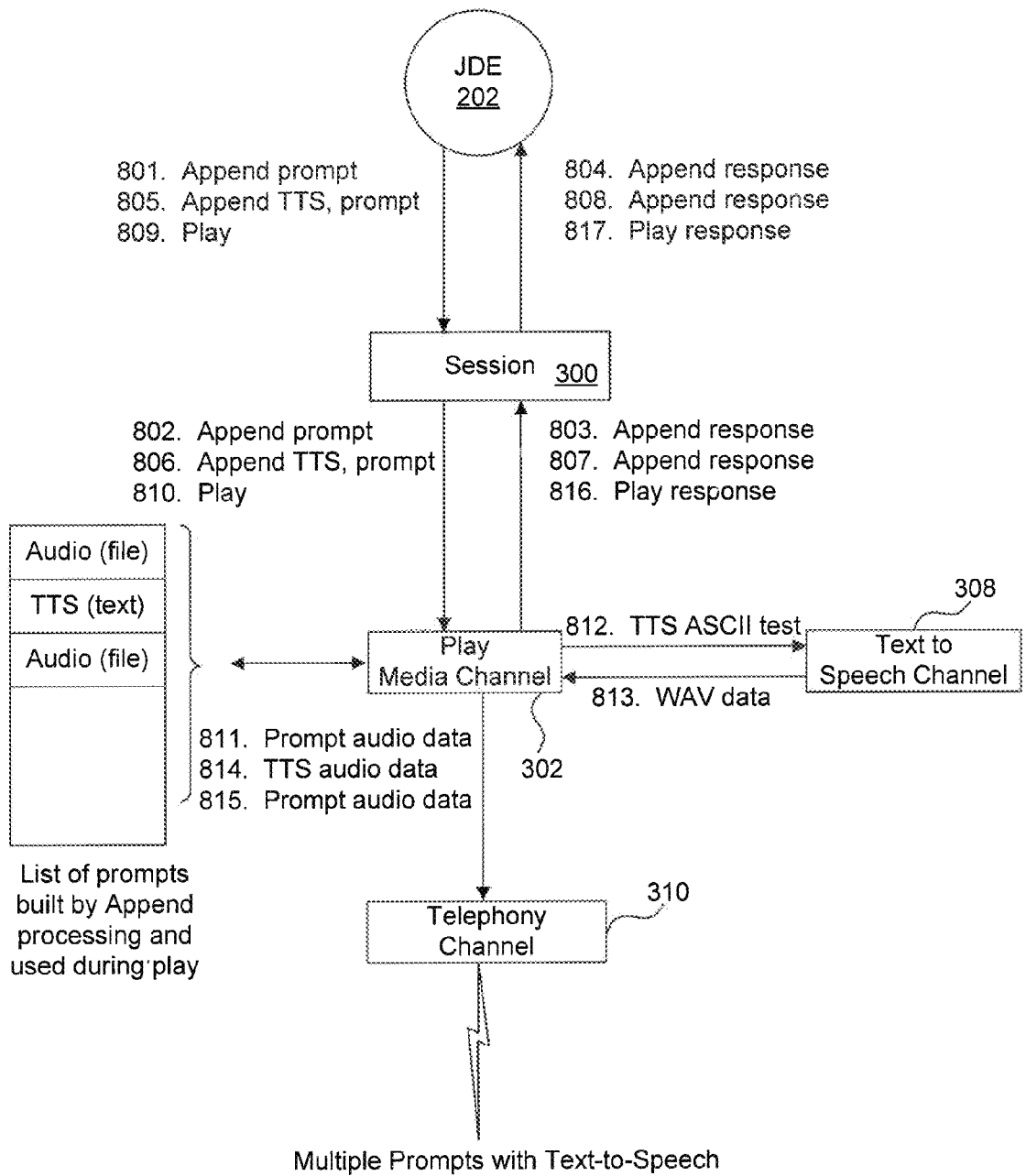
FIG. 9 is a diagram showing an example of processing an incoming call among components in a voice user interface in accordance with the present invention.
Figure 2:
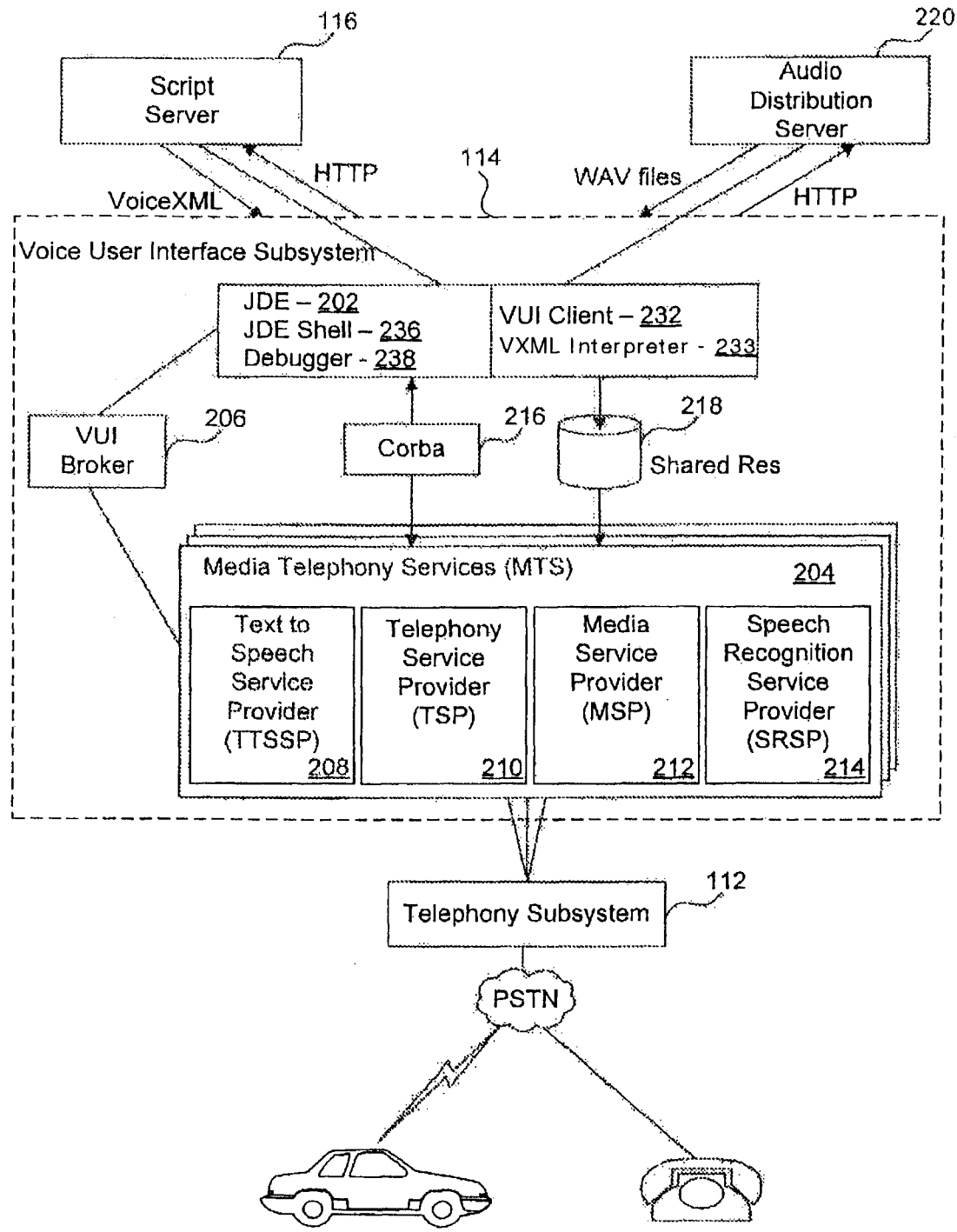
Figure 2A:
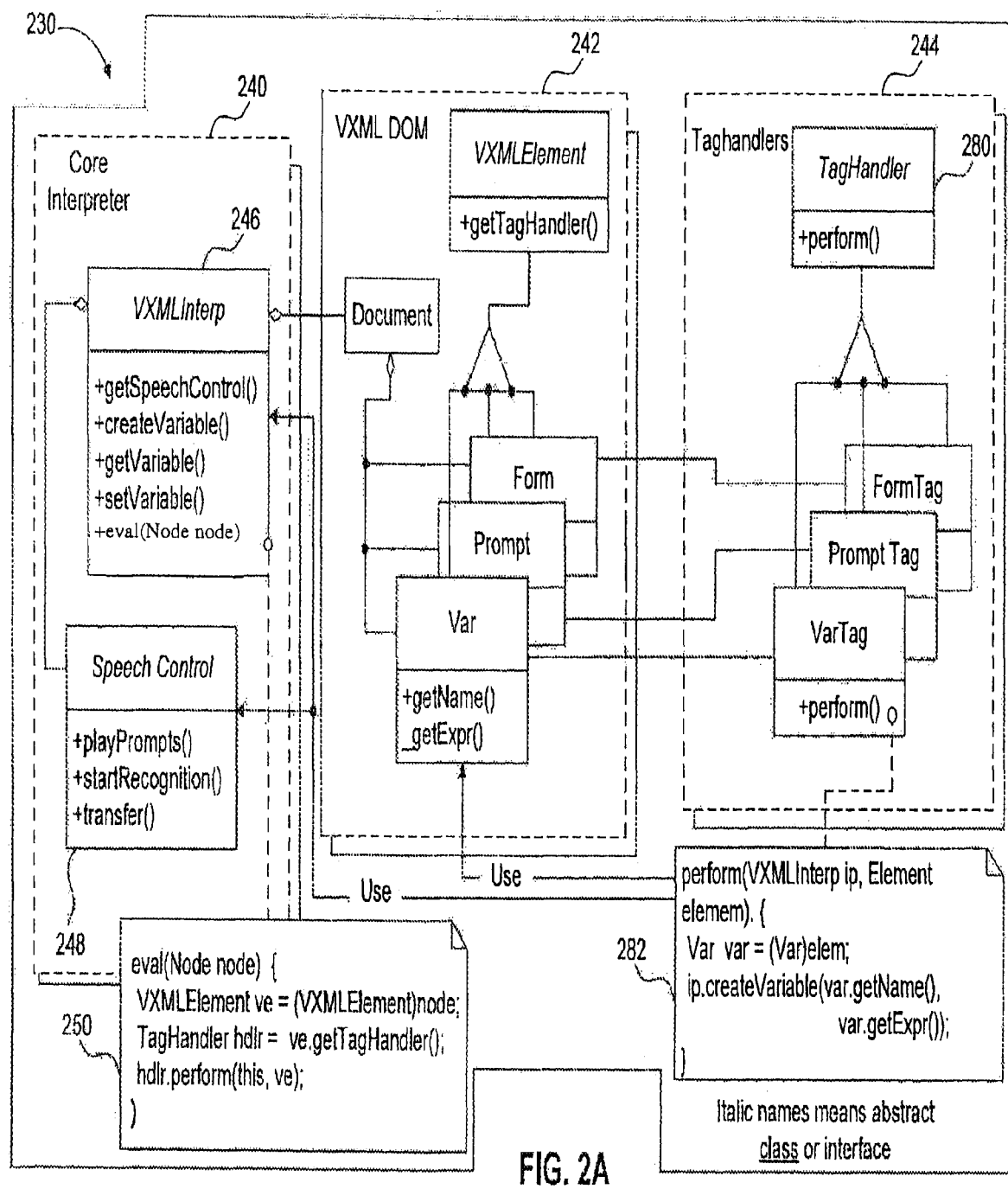
Figure 5:
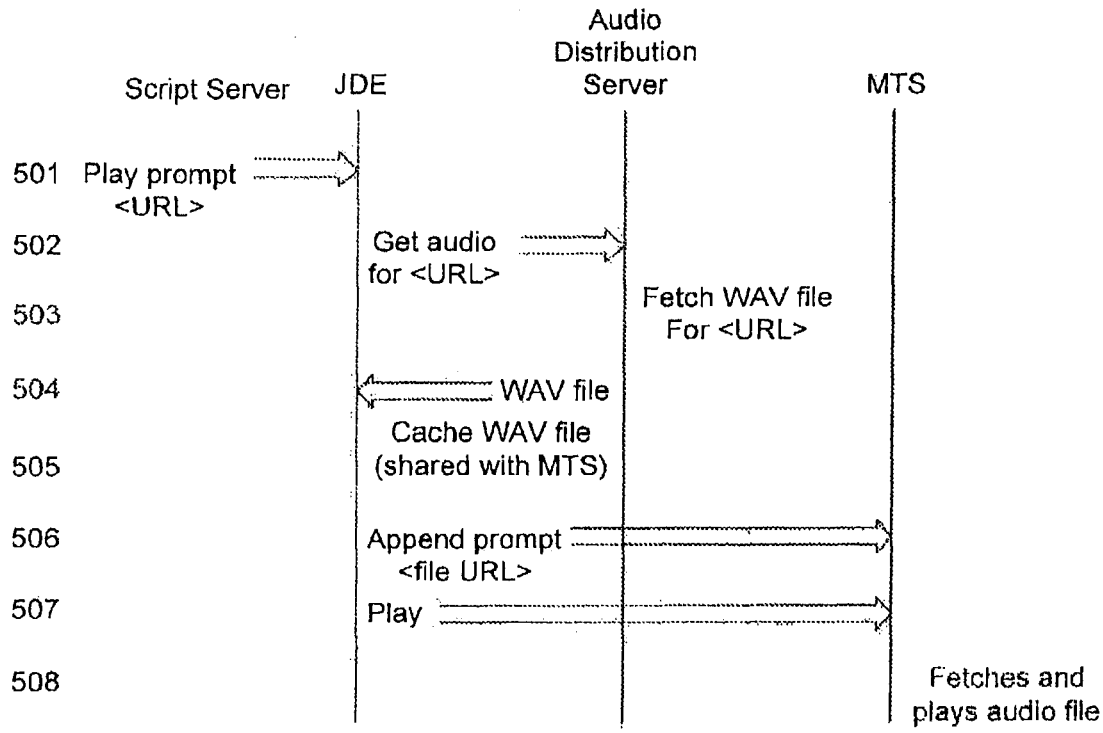
Figure 6:
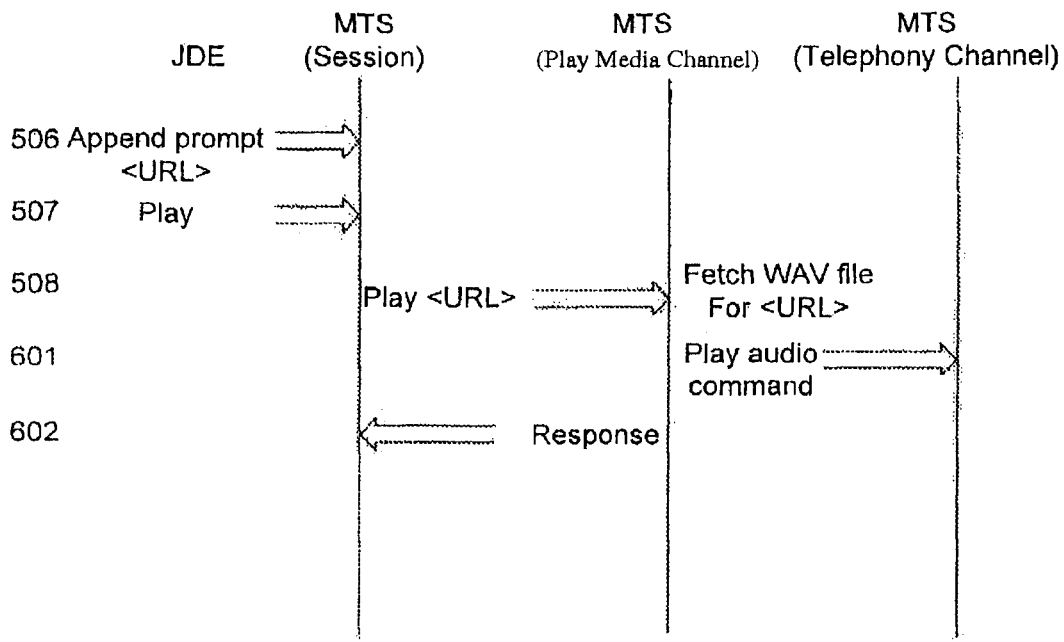
Figure 7:
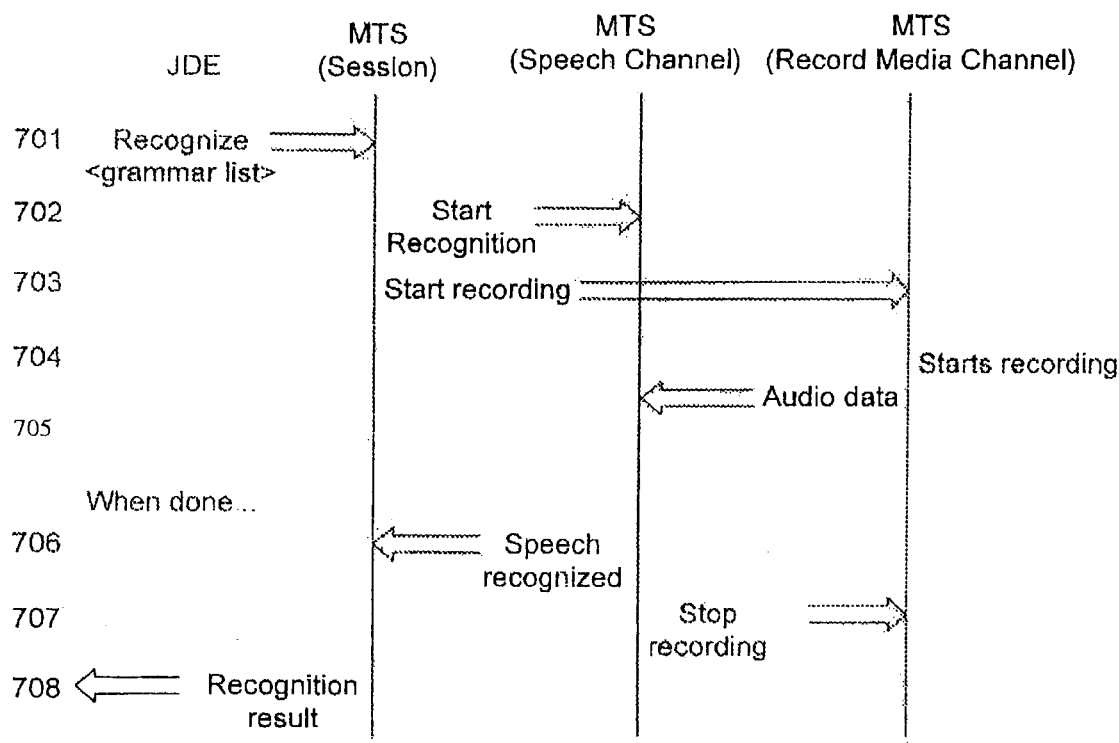
Figure 9:
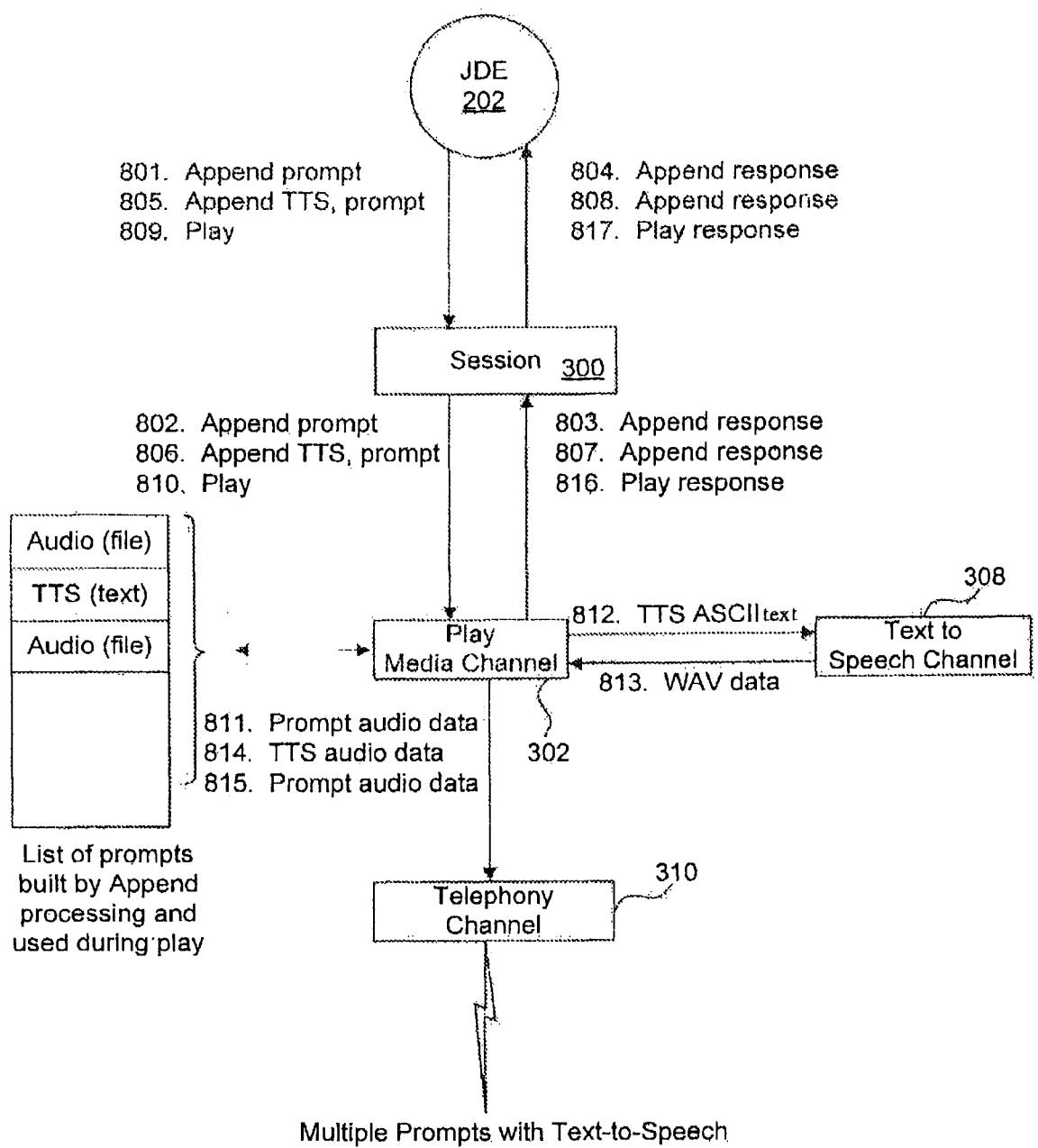

FIG. 8 shows an example of the detailed process flow when multiple prompts are queued, including a text to speech conversion. The flow diagram in FIG. 9 illustrates the process flow shown in FIG. 8 among components in VA system 100 (FIG. 1). In the example shown in FIGS. 8 and 9, VDE 202 transmits an append prompt request to play media channel 302 via MTS session 300 in processes 801 through 802. A response indicating whether the file containing the prompt was successfully accessed is then sent to VDE 202 from play media channel 302 via session 300 in processes 803 and 804.

To handle multiple requests, the example in FIGS. 8 and 9 show VDE 202 transmitting an "append TTS and prompt" request to play media channel 302 via MTS session 300 in processes 805 through 806. The second request is issued before a play prompt request is issued for the append prompt request. The play media channel 302 places the append TTS and prompt request in the queue and transmits a response indicating whether the file containing the prompt was successfully accessed to VDE 202 via session 300 in processes 807 and 808.

Once the multiple requests are issued, VDE 202 then issues the play prompts and recognize request to MTS session 300 in process 809. MTS session 300 transmits the request to play media channel 302 in process 810. In process 811, play media channel 302 issues fetch and play requests to telephony channel 310. In process 812, play media channel 302 issues a TTS request to text to speech channel 308. Note that the type of input format, such as ASCII text, may be specified. When text to speech channel 308 is finished converting the text to speech, it sends the resulting audio file to play media channel 302. In process 814 and 815, play media channel 302 sends the play requests for the audio and TTS files to telephony channel 310. A response indicating that the play commands were issued is then sent from the play media channel 302 to VDE 202 in processes 816 and 817.

The VA system 100 (FIG. 1) advantageously supports a wide range of voice-enabled telephony applications and services. The components in VA system 100 are modular and do not require knowledge of the application in which the VA system 100 is being used. All processing specific to VA system 100 is under the direction of VoiceXML scripts produced by the script server 116.

As a further advantage, VA system 100 is not tied to any particular vendor for speech recognition, text to speech translation, or telephony. The VA system 100 can be readily extended to incorporate advances in telephony, media, TTS and speech recognition technologies without requiring changes to applications.

A further advantage is that VA system 100 is capable of scaling up to tens of thousands of simultaneously active telephony sessions. This includes independently scaling the telephony, media, text to speech and speech recognition resources as needed.

Those skilled in the art will appreciate that software program instructions are capable of being distributed as a program product in a variety of forms, and that the present invention applies equally regardless of the particular type of signal bearing media used to actually carry out the distribution. Examples of signal bearing media include recordable type media such as floppy disks and CD-ROM, transmission type media such as digital and analog communications links, as well as other media storage and distribution systems.

Additionally, the foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure.

While the invention has been described with respect to the embodiments and variations set forth above, these embodiments and variations are illustrative and the invention is not to be considered limited in scope to these embodiments and variations. For example, although the present invention was described using the Java and XML programming languages, and hypertext transfer protocol, the architecture and methods of the present invention can be implemented using other programming languages and protocols. Accordingly, various other embodiments and modifications and improvements not described herein may be within the spirit and scope of the present invention, as defined by the following claims.

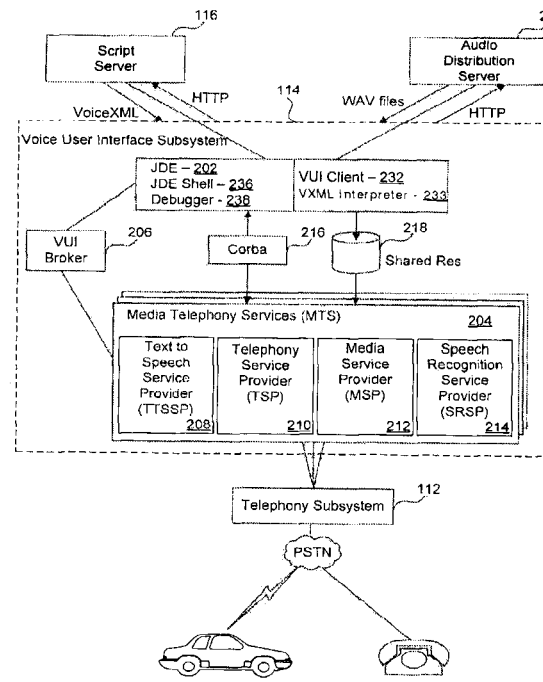

What is claimed is:

1. A method comprising:
    receiving, by a computing device, a communication request from an application program;
    establishing a session with a media communication server based on a session identifier provided by a broker; and
    forwarding the communication request to the media communication server.

2. The method of claim 1, wherein receiving the communication request from the application program comprises receiving an out-dial request from the application program.

3. The method of claim 1, further comprising:
    establishing communications by the media communication server over a communication subsystem based on the communication request.

4. The method of claim 3, wherein establishing communications comprises placing a call.

5. The method of claim 1, wherein the session identifier provided by a broker is based on a distribution of processing load.

6. The method of claim 1, further comprising:
    receiving an input from the media communication server via the session;
    interpreting a request for information in the input;
    communicating the request for information to a communication interface; and
    receiving information from the communication interface responsive to the request for information.

7. The method of claim 6, wherein receiving the information from the communication interface comprises receiving a script.

8. The method of claim 7, wherein receiving the script comprises receiving a markup language document.

9. The method of claim 7, further comprising:
    interpreting the script to produce one or more prompts; and
    sending the one or more prompts to the media communications server.

10. A computer-readable storage device having instructions stored thereon, execution of which, by a computing device, causes the computing device to perform operations comprising:
    receiving a communication request from an application program;
    establishing a session with a media communication server based on a session identifier provided by a broker; and
    forwarding the communication request to the media communication server.

11. The computer-readable storage device of claim 10, wherein receiving the communication request from the application program comprises receiving an out-dial request from the application program.

12. The computer-readable storage device of claim 10, the operations further comprising:
    establishing communications by the media communication server over a communication subsystem based on the communication request.

13. The computer-readable storage device of claim 12, wherein establishing communications comprises placing a call.

14. The computer-readable storage device of claim 10, wherein the session identifier provided by a broker is based on a distribution of processing load.

15. The computer-readable storage device of claim 10, the operations further comprising:
    receiving an input from the media communication server via the session;
    interpreting a request for information in the input;
    communicating the request for information to a communication interface; and
    receiving information from the communication interface responsive to the request for information.

16. The computer-readable storage device of claim 15, wherein receiving the information from the communication interface comprises receiving a script.

17. The computer-readable storage device of claim 16, wherein receiving the script comprises receiving a markup language document.

18. The computer-readable storage device of claim 16, the operations further comprising:
    interpreting the script to produce one or more prompts; and
    sending the one or more prompts to the media communications server.

19. A system comprising:
    a memory configured to store instructions comprising:
        instructions to receive a communication request from an application program,
        instructions to establish a session with a media communication server based on a session identifier provided by a broker, and
        instructions to forward the communication request to the media communication server; and
    one or more processors configured to process the instructions.

20. A system comprising:
    a media communication server; and
    a broker configured to establish a session, the session associated with a session identifier, between a client object and a media communication server based on receipt of a communication request from an application program, wherein the communication request is forwarded to the media communication server for handling.

* * * * *

UNITED STATES PATENT AND TRADEMARK OFFICE
CERTIFICATE OF CORRECTION

| | | |
|---|---|---|
| PATENT NO. | : 8,160,886 B2 | |
| APPLICATION NO. | : 13/195269 | |
| DATED | : April 17, 2012 | |
| INVENTOR(S) | : Tessel et al. | |

It is certified that error appears in the above-identified patent and that said Letters Patent is hereby corrected as shown below:

The title page showing the illustrative figure should be deleted and replaced with the attached title page.

Fig. 2, sheet 2 of 9.
Fig. 2A, sheet 3 of 9.
Fig. 6, sheet 6 of 9.
Fig. 7, sheet 7 of 9.
Fig. 9, sheet 9 of 9.
Should be deleted and replaced with attached sheets.

In the Specifications:

In Column 1, Line 8, delete "now allowed," and
insert -- now U.S. Pat. No. 8,005,683, --, therefor.

In Column 1, Lines 17-18, delete "patent applications: Ser." and insert
-- U.S. patent application Ser. --, therefor.

In Column 6, Line 13, delete "etc.)" and insert -- etc.). --, therefor.

In Column 9, Line 20, delete "ITS" and insert -- TTS. --, therefor.

In Column 9, Line 56, delete "factory" and insert -- factory. --, therefor.

In Column 13, Line 38, delete "ITS" and insert -- TTS --, therefor.

Signed and Sealed this
Sixteenth Day of October, 2012

David J. Kappos
*Director of the United States Patent and Trademark Office*

(12) United States Patent
Tessel et al.

(10) Patent No.: US 8,160,886 B2
(45) Date of Patent: *Apr. 17, 2012

(54) OPEN ARCHITECTURE FOR A VOICE USER INTERFACE

(75) Inventors: Marianna Tessel, Palo Alto, CA (US); Danny Lange, Cupertino, CA (US); Eugene Ponomarenko, Fremont, CA (US); Mitsuru Oshima, San Jose, CA (US); Daniel Burkes, San Francisco, CA (US); Tjoen Min Tjong, Milpitas, CA (US)

(73) Assignee: Ben Franklin Patent Holding LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,269

(22) Filed: Aug. 1, 2011

(65) Prior Publication Data

US 2011/0289188 A1 Nov. 24, 2011

Related U.S. Application Data

(63) Continuation of application No. 12/389,876, filed on Feb. 20, 2009, now Pat. No. 8,005,683, which is a continuation of application No. 11/340,844, filed on Jan. 27, 2006, now Pat. No. 7,496,516, which is a continuation of application No. 09/732,812, filed on Dec. 8, 2000, now Pat. No. 7,016,847.

(51) Int. Cl.
*G10L 21/00* (2006.01)
*G06F 15/16* (2006.01)

(52) U.S. Cl. ............................. 704/275; 709/217
(58) Field of Classification Search ............ 704/275; 709/217

See application file for complete search history.

(56) References Cited

U.S. PATENT DOCUMENTS

| 6,247,052 | B1 * | 6/2001 | Huang et al. ............... 709/224 |
| 7,054,866 | B2 * | 5/2006 | Trivedi .......................... 1/1 |
| 7,441,007 | B1 * | 10/2008 | Kirkpatrick et al. ........ 709/213 |
| 8,018,955 | B2 * | 9/2011 | Agarwal et al. ............. 370/401 |

* cited by examiner

*Primary Examiner* — Susan McFadden
(74) *Attorney, Agent, or Firm* — Sterne, Kessler, Goldstein & Fox PLLC

(57) ABSTRACT

A system and method for processing voice requests from a user for accessing information on a computerized network and delivering information from a script server and an audio server in the network in audio format. A voice user interface subsystem includes: a dialog engine that is operable to interpret requests from users from the user input, communicate the requests to the script server and the audio server, and receive information from the script server and the audio server; a media telephony services (MTS) server, wherein the MTS server is operable to receive user input via a telephony system, and to transfer the user input to the dialog engine; and broker coupled between the dialog engine and the MTS server. The broker establishes a session between the MTS server and the dialog engine and controls telephony functions with the telephony system.

20 Claims, 9 Drawing Sheets